(12) United States Patent
Shimada

(10) Patent No.: US 7,699,514 B2
(45) Date of Patent: Apr. 20, 2010

(54) LED VEHICULAR LAMP WITH FLAT REFLECTOR

(75) Inventor: Takeshi Shimada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 391 days.

(21) Appl. No.: 11/428,865

(22) Filed: Jul. 6, 2006

(65) Prior Publication Data

US 2007/0019432 A1 Jan. 25, 2007

(30) Foreign Application Priority Data

Jul. 25, 2005 (JP) .............................. 2005-214705

(51) Int. Cl.
*F21S 8/10* (2006.01)
*B60Q 1/06* (2006.01)
*F21V 7/10* (2006.01)

(52) U.S. Cl. .................. 362/545; 362/507; 362/516; 362/514; 362/548; 362/547

(58) Field of Classification Search .............. 362/514, 362/465, 466, 467, 547, 544, 545, 240, 241, 362/284, 507, 516, 548

See application file for complete search history.

(56) References Cited

U.S. PATENT DOCUMENTS

| | | | | |
|---|---|---|---|---|
| 4,363,085 A | * | 12/1982 | Demas ........................ | 362/467 |
| 5,099,400 A | * | 3/1992 | Lee ............................. | 362/467 |
| 6,302,553 B1 | * | 10/2001 | Izawa ......................... | 362/466 |
| 6,623,147 B2 | * | 9/2003 | Hayami et al. .............. | 362/467 |
| 6,951,414 B2 | * | 10/2005 | Amano ....................... | 362/511 |
| 7,144,145 B2 | * | 12/2006 | Watanabe et al. ........... | 362/544 |
| 7,201,506 B2 | * | 4/2007 | Ishida et al. ................ | 362/544 |
| 7,237,935 B2 | * | 7/2007 | Ito et al. ..................... | 362/547 |
| 7,261,448 B2 | * | 8/2007 | Ishida et al. ................ | 362/545 |
| 2002/0051364 A1 | * | 5/2002 | Ishikawa .................... | 362/466 |
| 2002/0064051 A1 | * | 5/2002 | Sugimoto et al. ........... | 362/467 |
| 2003/0039124 A1 | * | 2/2003 | Tawa et al. .................. | 362/467 |
| 2004/0008516 A1 | * | 1/2004 | Amano ....................... | 362/545 |
| 2004/0202007 A1 | * | 10/2004 | Yagi et al. ................... | 362/545 |
| 2005/0122735 A1 | * | 6/2005 | Watanabe et al. ........... | 362/539 |

* cited by examiner

*Primary Examiner*—Ismael Negron
(74) *Attorney, Agent, or Firm*—Cermak Kenealy Vaidya & Nakajima LLP

(57) ABSTRACT

An LED vehicular lamp with reflector can include a plurality of LED modules each having respective appropriate light distributions. The modules can be attached to a housing to form a light distribution characteristic though combination of the light emitted from the LED modules. At least part of the LED modules can include an illumination axis that is substantially at a right angle to the optical axis of the lamp such that light reflected at a reflector provided in the housing travels in the illumination direction of the LED light source vehicular lamp. The LED modules can also include a rear end that protrudes from an outer surface of the housing to improve the heat radiation efficiency, which enables the use of LED chips that can use higher permissible current values.

7 Claims, 3 Drawing Sheets

LED VEHICULAR LAMP WITH FLAT REFLECTOR

This application claims the priority benefit under 35 U.S.C. §119 of Japanese Patent Application No. 2005-214705 filed on Jul. 25, 2005, which is hereby incorporated in its entirety by reference.

BACKGROUND

1. Technical Field

The presently disclosed subject matter relates to a structure of a vehicular lamp having a light source including a plurality of light emitting diodes (LEDs).

2. Description of the Related Art

A vehicular lamp 90 of the related/conventional art may include a light source 91 and a flat mirror 92 located in a direction that is forward and in the illumination direction of the light source 91, as shown in FIG. 3. The light source 91 is composed of a halogen bulb 91a and a paraboloid of revolution 91b to generate a paralleled light. The light source 91 is attached in a housing 93 to emit light upward.

In the housing 93, the flat mirror 92 is arranged basically at an angle of 45° with respect to the light from the light source 91 such that it can reflect the light from the light source 91 into a horizontal direction. The reflected light is then externally projected as a horizontal light through a lens 96 arranged in a corresponding side 95 of the housing 93.

In the case of a truck or the like, when an increase in load on a carrier lifts or angles the front of the vehicle upward as a whole, the light from the vehicular lamp 90 also is caused to be directed upward, and possibly dazzles oncoming cars. Accordingly, for example, the amount of gravity-caused distortion of suspension springs is used to measure the pitch angle of the body. In this case, actuators 97 may be employed to adjust the angle of elevation of the flat mirror 92 so as to correct the amount of distortion to always keep the illumination direction horizontal (See for example, U.S. Pat. No. 4,363,085, the entire disclosure of which is incorporated herein by reference).

In recent years, there is an increasing trend towards the utilization of LEDs in the light source of vehicular lamps. Compared to an incandescent bulb and a halogen bulb, an LED has a smaller amount of light per element. This point requires the use of more LEDs, and results in a problem associated with heat radiation in the housing and a problem associated with the development of an attaching method that achieves a correct illumination direction.

SUMMARY

The presently disclosed subject matter addresses and attempts to solve the above and other problems related to the conventional art. In accordance with an aspect of the disclosed subject matter, an LED light source vehicular lamp can be provided that includes a housing, a reflector provided in the housing, and a plurality of LED modules having respective and appropriate light distributions. The LED modules can be attached to the housing to form a light distribution characteristic through combination or superimposition of light emitted from the LED modules. At least part of the LED modules can have an illumination axis that is located almost or substantially at a right angle to the optical axis of the LED light source vehicular lamp, such that light reflected at the reflector provided in the housing travels in the illumination direction of the LED light source vehicular lamp. The LED modules can also each have a rear end that protrudes externally from the outer surface of the housing.

In the disclosed subject matter, when the LED modules are attached to the housing, the rear ends of the LED modules can be located flush with the outer surface of the housing, and can also possibly protrude therefrom. Therefore, the rear ends of the LED modules can be present outside the housing and be directly brought into contact with the open air to improve cooling efficiency. The rear ends of the LED modules may be equipped with respective heat sinks, such as finned metal, ceramic or other material structures. In this case, the area directly brought into contact with the open air can be increased to further improve the cooling efficiency.

DETAILED DESCRIPTION OF EXEMPLARY EMBODIMENTS

Figure 1:
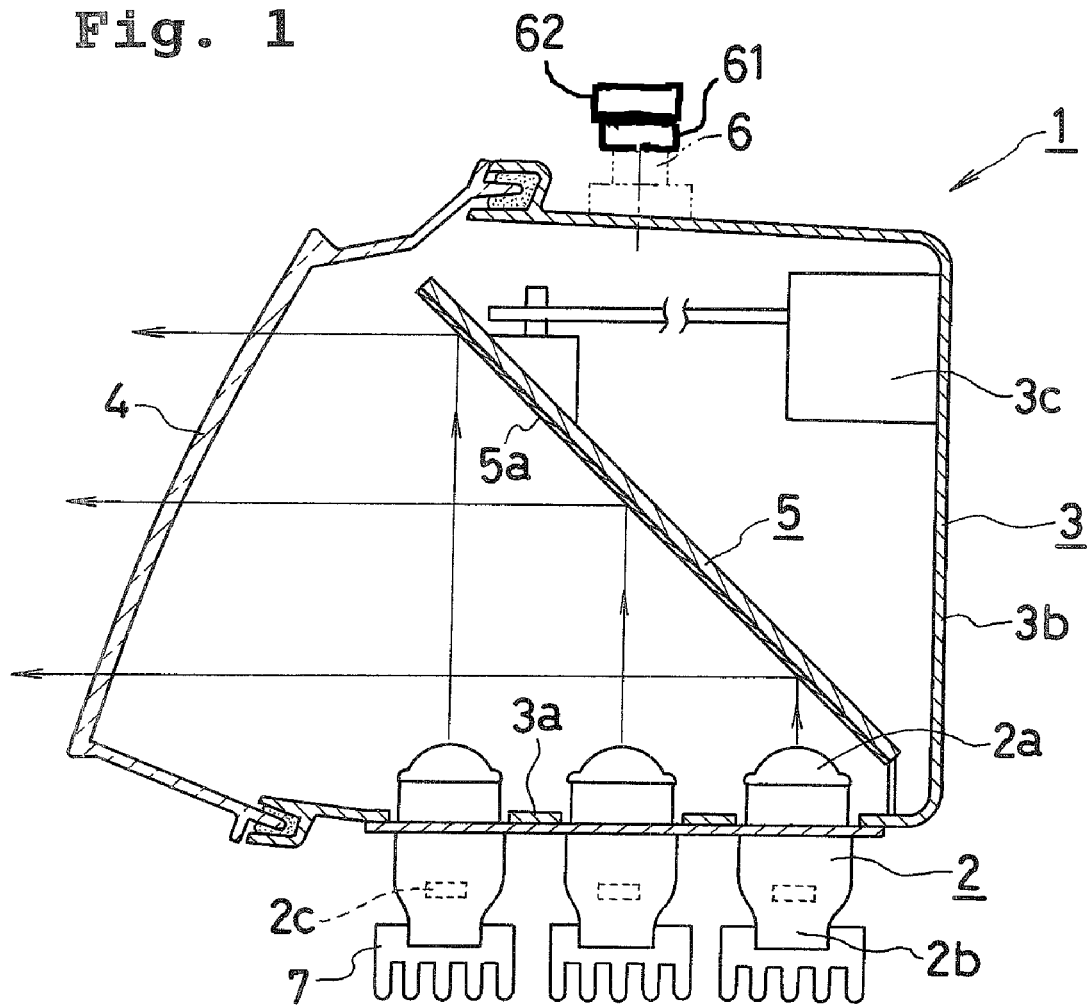
FIG. 1 is a cross sectional view showing an embodiment of a LED light source vehicular lamp made in accordance with principles of the presently disclosed subject matter.

The disclosed subject matter will now be described in detail based on the embodiments shown in the figures. Denoted in FIG. 1 with the reference numeral 1 is a LED light source vehicular lamp made in accordance with principles of the presently disclosed subject matter. The LED light source vehicular lamp 1 may be configured to be a headlight. In this case, an LED chip 2c having a white or yellow emission color that is the normal lamp color of the headlight can be located in an LED module 2, and an appropriate number of such LED modules 2, can be employed. In one example, nine LED modules 2 can be employed.

Of course, the number of LED modules 2 is not limited to nine, but may be any number. Several factors can be considered in determining the appropriate number of LED modules 2. For example, whether the number can achieve the stipulated brightness and light distribution pattern when the lamp is to be used as a headlight can be considered, for example. The following description is given with respect to an example that includes nine LED modules 2 arrayed in a matrix of 3×3 for use.

The LED modules 2 can be fixed on the housing 3. An appropriate distribution characteristic of light can be obtained from refraction and so forth when passing through a lens 4 located at an opening of the housing 3. Alternatively, the LED modules 2 may have respective lens portions 2a to form respective appropriate light distributions. These light distributions can be combined or superimposed to obtain a desired light distribution characteristic.

A flat mirror or reflector 5 can be located in the housing 3 at a substantially 45° angle with respect to a mirror surface 5a facing downward—the mirror surface 5a capable of directing light towards the lens 4. The LED modules 2 can be attached to the bottom 3a of the housing 3 such that the LED modules 2 emit lights upward. The bottom 3a may be formed of a separate member that can be attached to a certain position of the housing 3 after the LED modules 2 are attached at certain positions. The LED modules 2 can include a body portion connecting the rear end portion 2b to a front light emitting portion. The front light emitting portion of the LED modules 2 can include lens portions 2a.

In the above described structure, light emitted upward from the LED modules 2 can be reflected at the reflector 5 and refracted substantially 90°, then travel in the horizontal direction, that is, the normal illumination direction of the vehicular lamp, and projected.

The LED modules 2 can be fixed on the lower surface or bottom 3a of the housing 3. In addition, the LED chips 2c, which act as heat sources and are attached in the vicinity of the rear end portions 2b, can be attached in a position that extends outward from the housing 3. Therefore, it is possible to improve the cooling effect on the LED chips 2c.

When part of the LED module 2 protrudes to an external portion from the housing, an error may arise in terms of a direction of attachment for the LED modules 2. However, an appropriate adjustment mechanism can be provided to adjust for such an error from outside the housing 3. Accordingly, quality control of the product at the time of shipping can be facilitated, and maintenance in the market can be easily performed.

If further cooling is required for the LED chips 2c, heat sinks 7 may be attached to the portions of the LED chips 2c that protrude below the housing 3 to increase the surface area per volume at those portions and to thus improve the cooling efficiency. This allows a larger amount of current to safely flow in the LED chips 2c to make the LED light source vehicular lamp 1 brighter.

Denoted in FIG. 1 with the reference numeral 6 is a conventional shaft for an Adaptive Front Lighting System (AFS) 62, which operates in relation to a vehicular steering gear to point the illumination direction of the LED light source vehicular lamp 1 in the vehicular turning direction. This shaft 6 is employed to rotate the whole of the housing 3, that is, the whole of the LED light source vehicular lamp 1, and has a great deal of strength and can be mechanically upsized. A drive mechanism 61 can be provided with the AFS to drive the shaft 6.

Alternatively, or in combination, the reflector 5 can be rotated to change the illumination direction. Accordingly, it may not be required to move the whole of the LED light source vehicular lamp 1. This is particularly effective to lighten the movable portion and simplifies the structure, such as a drive mechanism 3c, correspondingly. In addition, if the angle of elevation of the reflector 5 is made changeable, the position of the body, such as "front upward" and "front downward," can be corrected at the same time.

When the AFS mechanism is provided, the vehicle (lamp) may be designed for left-side passage. In this case, a light portion described as an "elbow" is formed at an appropriate part in the left half of the light distribution to generate an upward light, which makes it easier to identify pedestrians on the left side of the path and read traffic signs, etc. Of course, the lamp can also be used in markets in which right side passage occurs, such as the U.S. market. In this case, the elbow is designed to generate and upward light distribution on the right side to identify pedestrian traffic signs, or other objects on the right side path of the vehicle.

When the vehicle turns left in a left side passage jurisdiction, the AFS mechanism can also be configured to direct the lamp to the left and thus prevent the upward light from projecting to the opposite lane. When the vehicle turns right, to the contrary, the elbow can also be directed to the opposite lane which may dazzle oncoming cars.

Figure 2:
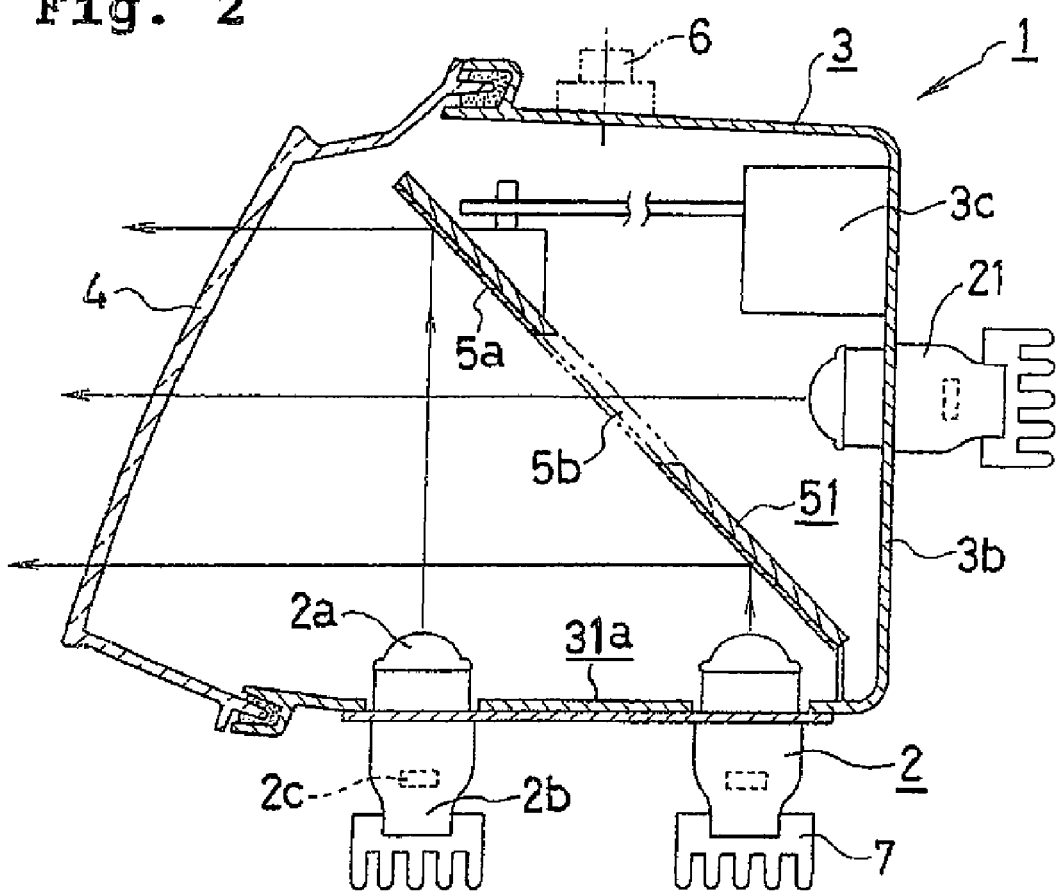
FIG. 2 is a cross sectional view showing another embodiment of a LED light source vehicular lamp made in accordance with principles of the presently disclosed subject matter.
Figure 3:
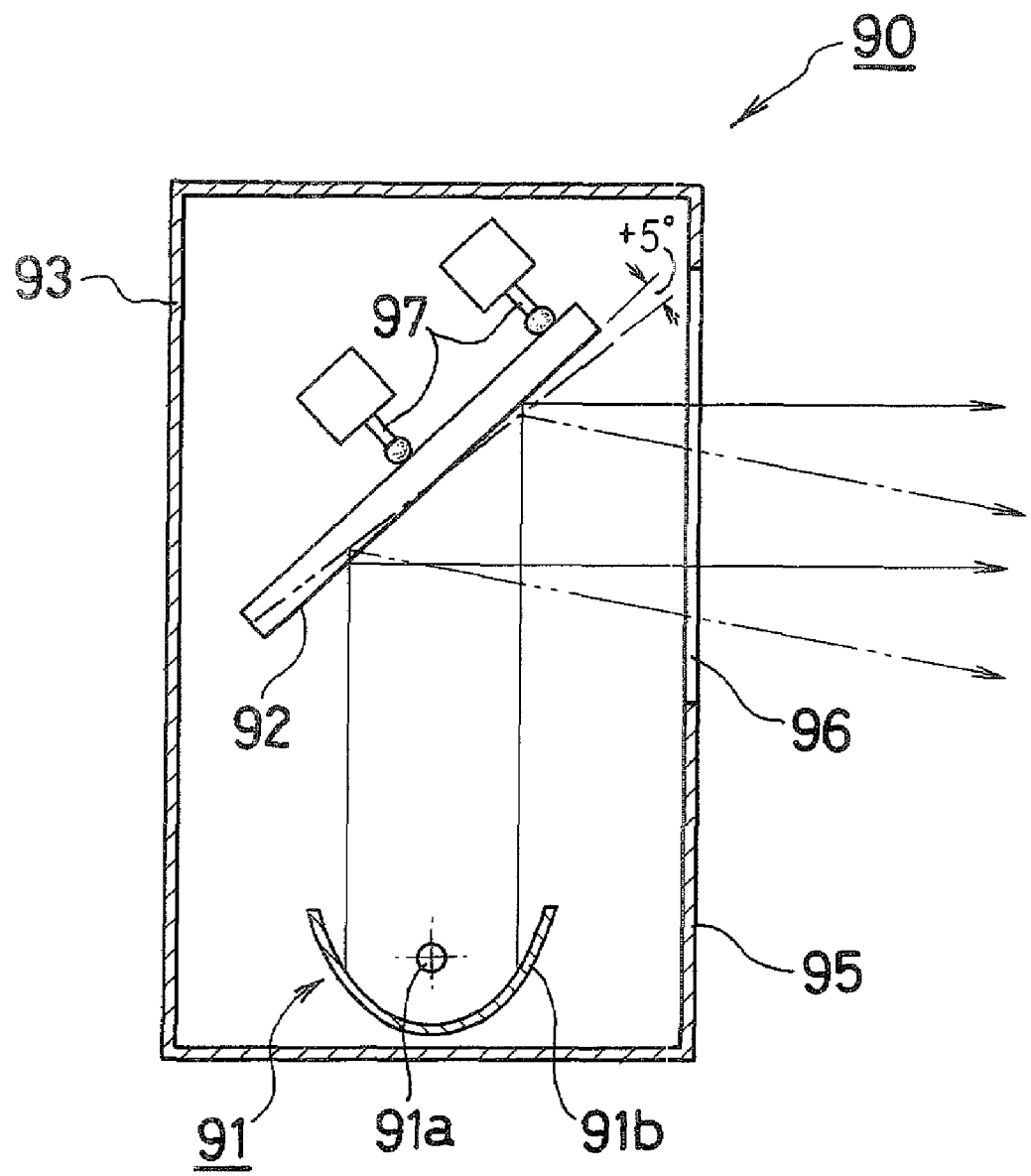
FIG. 3 is a cross sectional view showing an example of a conventional art lamp.

FIG. 2 shows another example of a structure that is designed not to cause such a state when turning right in a left side passage jurisdiction. At an appropriate position on a reflector 51, for example, in the vicinity of the center, an opening 5b can be formed. A fixed LED module 21 can be fixed behind the back of the reflector 51, for example, on the back 3b of the housing 3 to form a distribution pattern of light corresponding to the elbow portion and passing though the opening 5a.

In the LED light source vehicular lamp 1, the function of an AFS can be achieved by rotating the reflector 51 in accordance with the turning direction of the vehicle. Accordingly, the elbow portion formed by the fixed LED module 21 can be located at the left side from the center of the body. As a result, even at the time of operation of the steering gear, the traveling direction is not illuminated prior to turning of the vehicle, and accordingly occurrences of dazzling oncoming cars can be reduced.

As described above, the LED modules 2 can be combined to form the vehicular lamp 1. The emission direction of light from the LED module 2 is designed to be upward, and the rear end 2b of the LED module 2 is arranged as facing the outside of the housing 3. Thus, the most heat-producing portion in the LED module 2 is located on the back 3b and the lower surface 31a of the housing 3 for being easily cooled by the open air. This is effective to improve the cooling efficiency of the LED chip.

Further, the heat sink 7 can be attached to a portion of the LED module 2 that is brought into contact with the open air to further improve the cooling efficiency. Thus, it is possible to realize a brighter LED light source vehicular lamp by increasing the current flowing in the LED module 2 and/or narrowing the interval between the LED modules 2.

In addition, the reflector 51 can be used to allow light from the LED module 2 to impinge on the reflector 51, and the reflector 5-51 can rotate to perform an AFS operation. In this case, the LED module 2 that is operative to emit light that impinges on the reflector 51 may be used together with the fixed LED module 21 that is operative to emit light that does not impinge on the reflector 51. Thus, an AFS with various specifications can be determined, for example, to prevent the upward light from projecting to the opposite driving lane.

In the example shown in the preceding embodiment, the reflector 51 is rotated in relation to the steering gear of the vehicle to change the illumination direction to the horizontal direction. Aside from or in addition to this, the reflector 51 may be rotated in the vertical direction to provide the so-called optical axis adjuster function to keep the illumination direction substantially horizontal in accordance with the pitch angle of the vehicle. For example, a driver 3c can be connected to the reflector 51 to change the vertical and/or horizontal direction of light emission for the lamp 1.

The reflector 51 can be rotated and AFS functions can be utilized, or the function of optical axis adjustment can be provided. Accordingly, the amount of movement of the reflector 51 that is required can be only ½ relative to a required angle of alteration of the illumination direction. Thus, the spacing in the housing 3 required for movement of the reflector 51 can be reduced and the whole of the LED light source vehicular lamp 1 can be downsized.

A plurality of LED modules 2 may be used to form a high-illumination lamp. In this case, the reflector 51 is employed to reflect light and redirect it towards the illumination direction. The most heat-producing LED chips can also be located outside the housing. Further, heat sinks 7 can be attached in the vicinity of the LED chips. Thus, the disclosed lamp can be used in various applications, including for use as a lamp having a small light emission area and required brightness, for example, a vehicular lamp. Of course, the disclosed subject matter can be incorporated in other types of lamps, such as traffic lamps, spot lights, decorative lamps, etc.

Furthermore, the disclosed subject matter having LED modules on the bottom of the housing can have more technical advantages as compared to the above disclosed conventional art. For example, in the conventional art it is not necessary to include a combination of a flat mirror 92 and a paraboloid of revolution 91*b* while also having a specified part including LED modules thereon.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An LED light source vehicular lamp, comprising:
   a housing having a wall with an inner surface defining an interior and an outer surface, the wall forming an opening through which light can be emitted;
   a reflector arranged in the interior of the housing and formed as a flat mirror;
   a plurality of LED modules located in the housing and facing the flat mirror with at least one of the LED modules configured to provide a light distribution characteristic directed toward the flat mirror;
   the light having the light distribution characteristic reflected at the reflector travels in a direction of the opening; and
   at least one of the LED modules has a rear end that is exposed from the outer surface of the housing; and
   a second LED module, wherein the reflector has an opening and the second LED module is configured to emit light in a direction though the opening of the reflector.

2. An LED light source vehicular lamp having an optical axis along an illumination direction of the vehicular lamp, comprising:
   a housing having an inner surface defining an interior area and an outer surface defining an exterior area;
   a reflector provided at least partially in the interior area of the housing; and
   a plurality of LED modules having respective appropriate light distributions and located adjacent the housing to form a light distribution characteristic though one of a combination and a superimposition of light emitted from each of the LED modules,
   wherein at least one of the LED modules is configured to have an illumination axis substantially at a right angle to the optical axis of the LED light source vehicular lamp, the illumination axis of the at least one of the LED modules is directed to the reflector such that light reflected at the reflector travels in the illumination direction of the LED light source vehicular lamp,
   at least one of the LED modules has a rear end that is exposed from the outer surface of the housing, and
   the reflector has an opening, and at least another one of the plurality of LED modules is configured to emit light in a direction substantially parallel with the optical axis of the LED light source vehicular lamp such that the light emitted from the at least another one of the plurality of LED modules projects to the exterior area though the opening.

3. The LED light source vehicular lamp according to claim 2, wherein the rear end of the at least one of the LED modules is equipped with a heat sink.

4. The LED light source vehicular lamp according to claim 2, wherein the reflector is configured to be movable such that light emitted from the LED light source vehicular lamp remains at a predetermined orientation with respect to the horizon when a vehicular pitch angle changes.

5. The LED light source vehicular lamp according to claim 2, wherein the rear end of the at least one of the plurality of LED modules includes a heat sink structure and the front light emitting portion includes a lens.

6. The LED light source vehicular lamp according to claim 2, further comprising:
   a drive mechanism connected to the reflector and configured to drive the reflector such that light reflected at the reflector travels horizontally and in the vehicular turning direction.

7. The LED light source vehicular lamp according to claim 6, further comprising:
   an AFS device that controls the drive mechanism to change an angle of the reflector with respect to the housing in accordance with input from a vehicular steering gear.

* * * * *